(12) United States Patent  (10) Patent No.: US 9,148,695 B2
Nielsen  (45) Date of Patent: Sep. 29, 2015

(54) METHODS AND APPARATUS TO COLLECT MEDIA IDENTIFYING DATA

(71) Applicant: Christen V. Nielsen, Palm Harbor, FL (US)

(72) Inventor: Christen V. Nielsen, Palm Harbor, FL (US)

(73) Assignee: THE NIELSEN COMPANY (US), LLC, Schaumburg, IL (US)

( * ) Notice: Subject to any disclaimer, the term of this patent is extended or adjusted under 35 U.S.C. 154(b) by 218 days.

(21) Appl. No.: 13/754,408

(22) Filed: Jan. 30, 2013

(65) Prior Publication Data

US 2014/0211952 A1    Jul. 31, 2014

(51) Int. Cl.
*H04N 21/442* (2011.01)
*H04H 60/58* (2008.01)

(52) U.S. Cl.
CPC ......... *H04N 21/44204* (2013.01); *H04H 60/58* (2013.01)

(58) Field of Classification Search
CPC ............ H04R 2499/11; H04R 2201/003; H04R 19/04; H04R 1/2844; H04R 1/02; H04R 2201/02; H04R 2207/00; H04R 19/005; H04R 19/016; H04N 21/44204; H04H 60/58; B81B 2201/0257
USPC ......... 381/111, 113, 365, 171, 116, 174, 175, 381/369; 700/94
See application file for complete search history.

(56) References Cited

U.S. PATENT DOCUMENTS

| | | | |
|---|---|---|---|
| 6,243,474 B1 * | 6/2001 | Tai et al. ................. | 381/174 |
| 6,535,460 B2 * | 3/2003 | Loeppert et al. ........... | 367/181 |
| 7,146,016 B2 * | 12/2006 | Pedersen .................. | 381/175 |
| 7,269,267 B2 | 9/2007 | Song et al. | |
| 7,570,773 B2 * | 8/2009 | Ohbayashi et al. ......... | 381/175 |
| 7,790,492 B1 | 9/2010 | Baumhauer, Jr. et al. | |
| 8,041,064 B2 | 10/2011 | Kimura | |
| 8,094,844 B2 * | 1/2012 | Sung ..................... | 381/191 |
| 8,169,041 B2 | 5/2012 | Pahl et al. | |
| 8,175,299 B2 | 5/2012 | Song et al. | |
| 8,263,426 B2 * | 9/2012 | Ko et al. ................ | 438/53 |
| 8,467,551 B2 * | 6/2013 | Turnbull et al. ........... | 381/189 |
| 8,811,645 B2 * | 8/2014 | Inoda et al. ............. | 381/357 |
| 2005/0094832 A1 | 5/2005 | Song et al. | |
| 2008/0059988 A1 * | 3/2008 | Lee et al. ................ | 725/9 |
| 2008/0230858 A1 | 9/2008 | Chien | |
| 2008/0310663 A1 | 12/2008 | Shirasaka et al. | |
| 2009/0092274 A1 | 4/2009 | Song | |
| 2010/0128914 A1 | 5/2010 | Khenkin | |
| 2010/0272302 A1 * | 10/2010 | Feiertag et al. ........... | 381/361 |
| 2012/0177229 A1 * | 7/2012 | Lorenz et al. ............ | 381/111 |
| 2012/0243721 A1 | 9/2012 | Inoda et al. | |
| 2012/0257777 A1 | 10/2012 | Tanaka et al. | |

* cited by examiner

*Primary Examiner* — Vivian Chin
*Assistant Examiner* — Jason R Kurr
(74) *Attorney, Agent, or Firm* — Hanley, Flight & Zimmerman, LLC

(57) ABSTRACT

Methods and apparatus to collect media identifying data are disclosed. An example method includes collecting audio data through a sound hole. The sound hole has a chamfered opening. The sound hole has an effective length-to-width ratio which is equal to or less than about 1.25 and analyzing the audio data to obtain media identifying data.

25 Claims, 6 Drawing Sheets

METHODS AND APPARATUS TO COLLECT MEDIA IDENTIFYING DATA

FIELD OF THE DISCLOSURE

This disclosure relates generally to audience measurement and, more particularly, to methods and apparatus to collect media identifying data.

BACKGROUND

Audience measurement of media (e.g., content and/or advertisements) often involves collection of media identifying information and/or data (e.g., signature(s), fingerprint(s), code(s), tuned channel identification information, time of exposure information, etc.) and people data (e.g., user identifiers, demographic data associated with audience members, etc.). The media identifying information and the people data can be combined to generate, for example, media exposure data (e.g., ratings data) indicative of amount(s) and/or type(s) of people that were exposed to specific piece(s) of media distributed via one or more distribution mediums (e.g., broadcast television and/or radio, stored audio and/or video content played back from a memory such as a digital video recorder or a digital versatile disc, a webpage, audio and/or video media presented (e.g., streamed) via the Internet, a video game, targeted broadcast, satellite broadcast, cable, video on demand, etc.).

DETAILED DESCRIPTION

Figure 1:
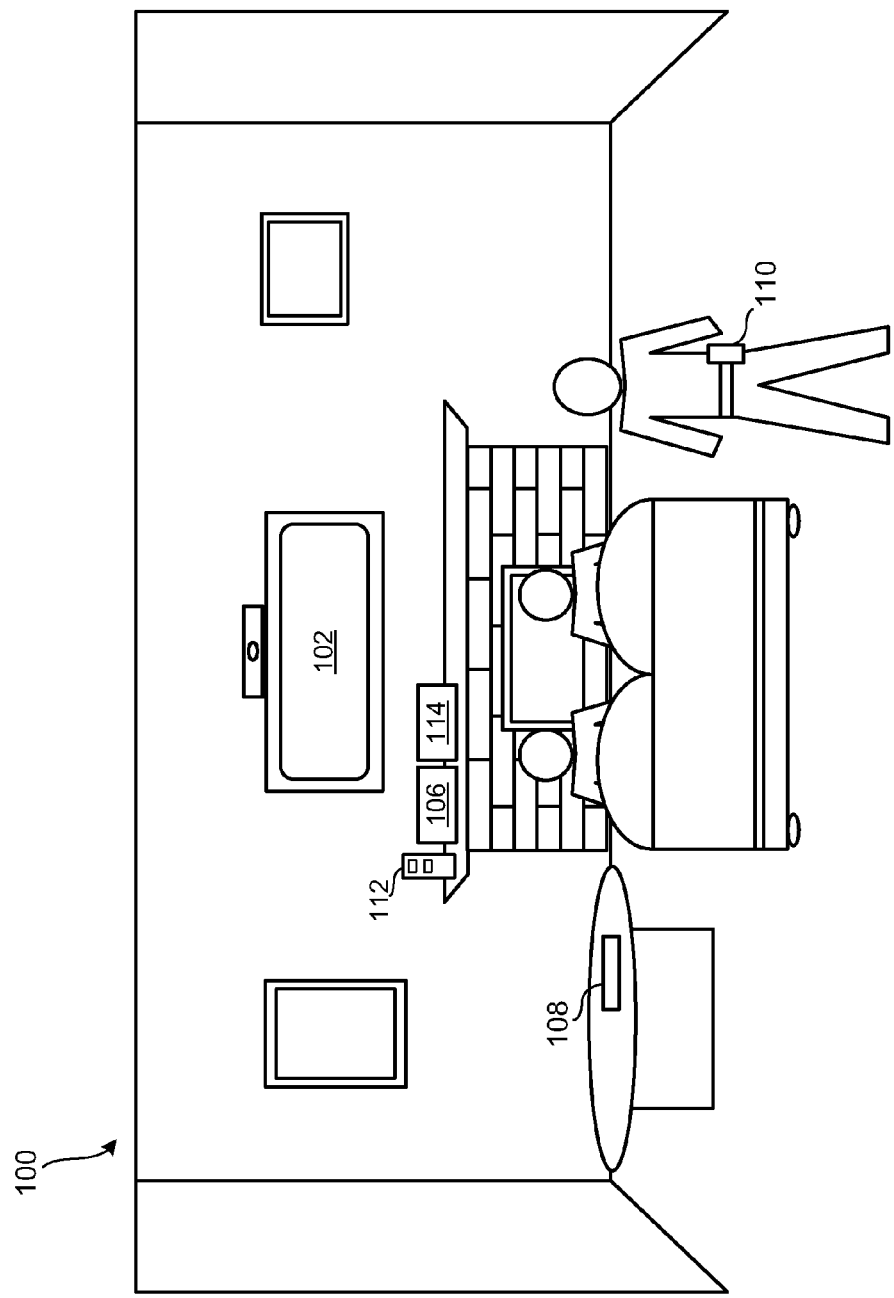
FIG. 1 is an illustration of an example exposure environment including an example audience measurement device constructed in accordance with the teachings of this disclosure.

In some audience measurement systems, media identifying information and/or people data is collected from a media exposure environment (e.g., a room in which an information presenting device such as a television is present, a family room, a living room, a bar, a restaurant, an office space, a cafeteria, etc.) by capturing, for example, audio data and/or a series of images of the environment. Often, the media identifying device is collected by capturing ambient audio. The ambient audio may then be analyzed to obtain, for example, media identifying information such as signature(s), fingerprint(s), code(s), etc. Some systems additionally or alternatively collect other data (e.g., video data, tuning data, etc.) to facilitate media and/or audience identification. As used herein, a code is an identifier that is transmitted with the media for the purpose of identifying the media and/or for tuning to the corresponding media (e.g., via a packet identifier header and/or other data used to tune or select packets in a multiplexed stream of packets). Codes may be carried in the audio, in the video, in metadata, in a vertical blanking interval, in a program guide, in content and/or advertising data, or in any other portion of the media and/or the signal carrying the media. As used herein, a signature is a representation of one or more characteristic(s) of one or more signal(s) carrying or representing one or more aspects of the media (e.g., a frequency spectrum of an audio signal). Signatures may be thought of as fingerprints of the media. Collected signature(s) can be compared against a collection of reference signatures of known media to identify the media.

In some examples, the collected media identifying information is compared to reference media identifying information to identify the media presented. Typically, the collected media identifying information is time stamped with a date and/or time of collection to facilitate association of identified media with the person(s) and/or demographic(s) of the person(s) in the audience. To this end, images of the media exposure environment may be analyzed to determine, for example, an identity of one or more persons present in the media exposure environment, an amount of people present in the media exposure environment during one or more times and/or periods of time, etc. Such information is referred to herein as people data. Other methods of collecting people data are known, some of which do not utilize images of the environment. For example, people meters are known that collect people data by periodically requesting audience members to self identify by, for example, selecting a corresponding input on a people meter.

The collected people data can be correlated with the collected media identifying information corresponding to detected media to provide exposure data for that media. For example, an audience measurement entity (e.g., The Nielsen Company (US), LLC) can calculate ratings for a first piece of media (e.g., a television program) by correlating data collected from a plurality of panelist sites with the demographics of the panelist(s) present in the audience for that first piece of media. The data collected from multiple panelist sites is combined and/or statistically analyzed to provide ratings representative of media exposure of a population of interest.

Audience measurement meters often listen to ambient audio in the exposure environment to collect audio data to identify media generated in the environment. In some such examples, bottom-ported microphones (e.g., MicroElectro-Mechanical System (MEMS) microphones) are used in connection with these audience measurement meters to capture the ambient audio. In some examples, these microphones "listen" and/or capture the ambient audio through a relatively small-diameter sound hole or port (e.g., 28 mils) defined by a printed circuit board (PCB), a wall (e.g., a plastic wall) of the housing of a meter, etc. The sound hole has a relatively small diameter to enable an acoustic seal to be made with the microphone. In prior art devices, if the diameter of the sound hole is increased, the acoustic seal may not be effective and the microphone may not function as well as intended.

Some known PCBs used, for example, in audience measurement systems include multiple layers (e.g., between 8 and 12 layers) that cause the PCB to be relatively thick (e.g., about 80 mils) and the sound hole therethrough to have a relatively high length-to-width ratio (e.g., about 2.9 or greater). Such sound holes distort the frequencies of interest and, thus, decrease the accuracy of the collected audio data, thereby interfering with the collection of media identifying information. In other examples, if the length-to-width ratio of the sound hole is greater than a particular amount (e.g., about 2.9), the sound hole acts to distort frequencies of interest (e.g., high frequencies) and/or decrease the accuracy of the collected audio data. This distortion can affect audio data such that fewer watermarks and/or fewer fingerprints are matched. In contrast to these prior art devices, examples disclosed herein enable the effective length-to-width ratio of the sound hole to be relatively low (e.g., equal to or less than about 1.25), thereby reducing (e.g., preventing) the sound hole from distorting the collected data. In some examples, to decrease the effective length-to-width ratio of the sound hole while enabling an acoustic seal to be maintained between the microphone and the PCB, an opening of the sound hole spaced apart from the microphone is countersunk at an angle of between about 30-degrees and about 60-degrees. In some examples, the countersink is substantially acoustically invisible (e.g., the countersink has no appreciable effect on the sound arriving at the microphone). The countersink decreases both an effective acoustic path length of the sound hole and an effective length-to-width ratio of the sound hole. For example, if half the length of a sound hole is countersunk, the effective acoustic path length is one-half the effective acoustic path length of the sound hole without the countersink.

FIG. 1 is an illustration of an example media exposure environment 100 including a media and/or information presentation device 102 and a meter 106 for collecting audience measurement data. In the illustrated example of FIG. 1, the media exposure environment 100 is a room of a household (e.g., a room in a home of a panelist such as the home of a "Nielsen family") that has been statistically selected to develop television ratings data for a population/demographic of interest. In the illustrated example, one or more persons of the household have registered with an audience measurement entity (e.g., by agreeing to be a panelist) and have provided their demographic information to the audience measurement entity as part of a registration process to enable associating demographics with media exposure activities (e.g., television exposure, radio exposure, Internet exposure, etc.).

In the example of FIG. 1, the meter 106 is provided for collecting ambient audio. The ambient audio may be processed to extract media identification data. The example meter 106 of FIG. 1 is a dedicated audience measurement unit provided by the audience measurement entity. The example meter 106 of FIG. 1 includes its own housing, processor, memory and software to perform the desired audience measurement functions.

The example audience measurement system of FIG. 1 can be implemented in additional and/or alternative types of environments such as, for example, a theater, a restaurant, a tavern, a retail location, an arena, etc. For example, the environment may not be associated with a panelist of an audience measurement study, but may instead be a public location. Although the information presentation device 102 of FIG. 1 is a television, in some examples, the example audience measurement system of FIG. 1 is implemented, at least in part, in connection with additional and/or alternative types of media presentation devices such as, for example, a radio, a computer, a home theater system and/or any other communication device able to present media to one or more individuals.

As described in detail below in connection with FIG. 3, the example meter 106 of FIG. 1 monitors the environment 100 to collect audio data for use in identifying media being presented (e.g., displayed, played, etc.) by the information presentation device 102 and/or other media presentation devices. Various types of meters may be used to collect audio data representative of media being presented in the environment. For example, the meter 106 may be a stationary device (e.g., a device not intended to be carried by an audience member) and/or a mobile device 110 (e.g., a device meant to be carried by an audience member in day to day activities such as the Arbitron portable people meter). In some examples, identification(s) of media to which the audience is exposed are correlated with people data (e.g., presence information) collected by a people meter 108 to generate exposure data for the media. In some examples, the people meter is implemented in the stationary meter 108 and/or the mobile meter 110. The mobile meter 110 may be a portable people meter used to measure media exposure of one specific individual throughout the day (e.g., both in the home and out of the home).

Figure 2:
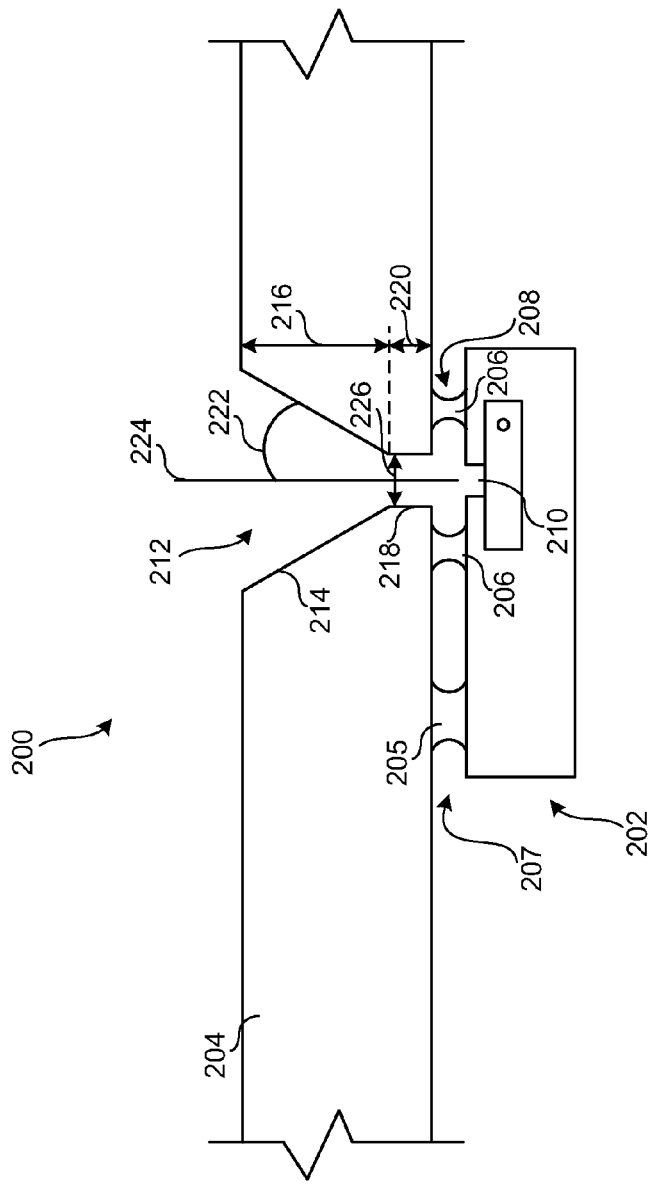
FIG. 2 depicts an example implementation of the example audience measurement device of FIG. 1.

FIG. 2 depicts an example apparatus 200 constructed in accordance with the teachings of this disclosure to collect audio and/or media identifying data. The apparatus 200 of the illustrated example includes a bottom-ported microphone and/or audio sensor 202 coupled to a printed circuit board (PCB) 204 via solder or another fastener 205, 206. In the illustrated example, the solder 205, 206 is one or more solder pads that make an electrical connection with the microphone 202 as well as mechanically coupling the microphone 202 to the PCB 204. The solder 206 of the illustrated example forms an annular ring 207 that creates a seal 208 between an aperture 210 of the microphone 202 and a sound hole or port 212 defined by the PCB 204.

In this example, the sound hole 212 includes a first, chamfered portion, tapered portion, conical portion and/or opening 214 having a first length 216 and a second or cylindrical portion 218 have a second length 220. While the first and second lengths 216, 220 may be any suitable length, in some examples, the first length 216 is approximately 50-mils (milli-inches) and the second length 220 is approximately 30-mils. While an angle 222 of the chamfered portion 214 relative to a centerline and/or axis 224 of the sound hole 212 may be between about 30-degrees and about 60-degrees, in the illustrated example, the angle 222 is about 45-degrees. As used herein, "about" is a term meant to accommodate minor differences associated with, for example, manufacturing tolerances. Thus, for example, decimal places beyond those recited can be ignored.

In some examples, the chamfered portion 214 is substantially acoustically invisible. As used herein, "substantially acoustically invisible" means, not substantially affecting audio data being received by the microphone 202. In other words, for purposes of collecting ambient audio for media identifying purposes, the presence of the chamfered portion 214 introduces negligible distortion such that it does not interfere with the collection of codes or signatures from ambient audio. Because the chamfered port 214 is substantially acoustically invisible, in the illustrated example, an acoustic path length of the sound hole 212 corresponds to the second length 220 and the length-to-width ratio of the sound hole 212 corresponds to the second length 220 divided by a diameter 226 of the cylindrical portion 218. In the illustrated example, the second length is 30 mils and the diameter 226 is 28 mils. Therefore, in the illustrated example, the length-to-width ratio of the sound hole 212 is 1.1.

Figure 3:
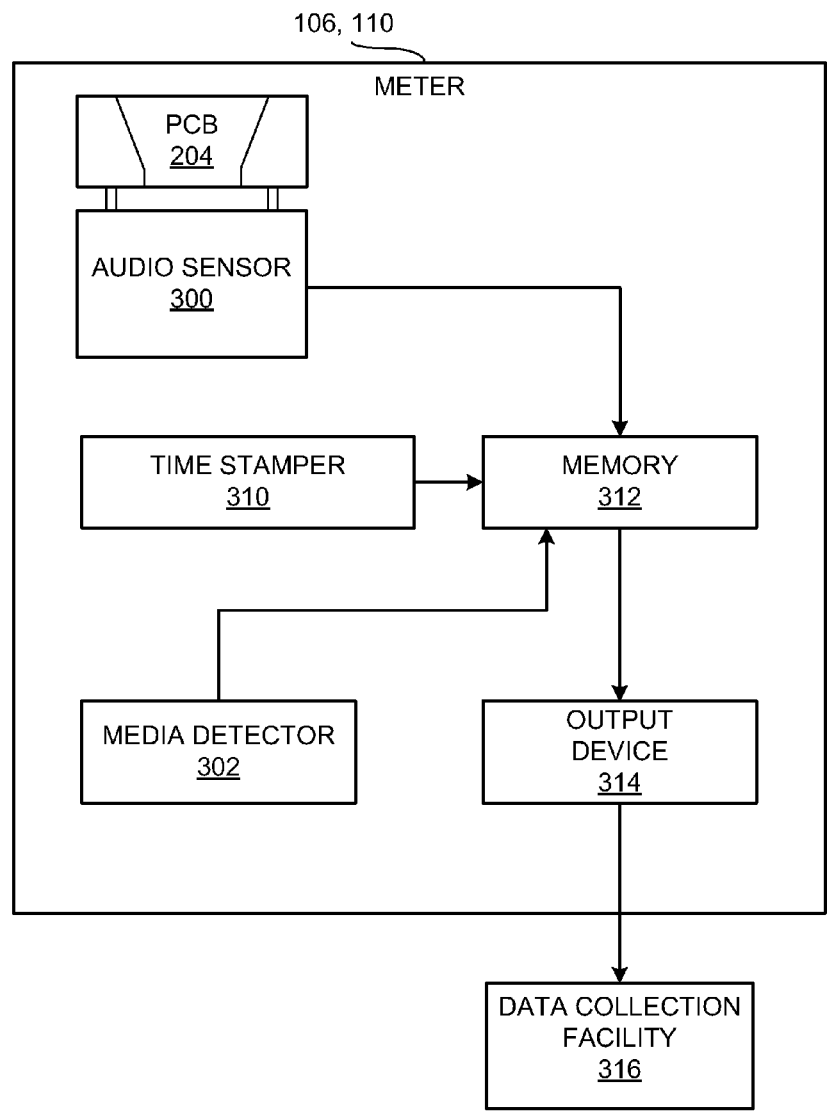
FIG. 3 is a block diagram of an example implementation of the example audience measurement device of FIGS. 1 and/or 2.

FIG. 3 is a block diagram of an example implementation of the example meters 106 and/or 110 of FIG. 1. People metering is done in a conventional manner and, thus, a separate illustration of the people meter 108 is not provided herein. The interested reader is referred to U.S. Pat. No. 7,609,853 for an example people meter. U.S. Pat. No. 7,609,853 is hereby incorporated by reference in its entirety. The example meters 106 and/or 110 of FIG. 3 include an audio sensor 300 to collect audio data representative of media being presented in the monitored exposure environment and a media detector 302 to obtain media identifying information from the audio data. The audio sensor 300 of the illustrated is implemented by one or more microphones used to capture audio data from the media exposure environment 100. The collected audio is written to memory 312. The audio data in the memory 312 is analyzed and/or filtered by the media detector 300 to identify, for example, media identifying information such as signature(s), fingerprint(s), code(s), etc. In the example of FIG. 3, the microphone 300 is a bottom ported microphone coupled to a PCB 204 having a countersunk sound hole 212. The sound hole 212 has a low effective length-to-width ratio (e.g., equal to or less than 1.25). In other examples, the sound hole 212 is defined in a housing wall (e.g., a plastic housing wall) of the example meters 106 and/or 110.

The example meters 106 and/or 110 of FIG. 3 include a time stamper 310 and a memory 312. The example time stamper 310 associates a time period (e.g., 1:00 a.m. Central Standard Time (CST)) and/or date (e.g., Jan. 1, 2012) with each media identification, etc., by, for example, appending the time and/or date information to an end of the audio data and/or the media identifying data. A data package (e.g., the time stamp, the identifier(s), the audio data, people identification data, etc.) is stored in the memory 312.

The memory 312 of the illustrated example may be implemented by any desired type and/or size of memory device. For example, the memory 312 may be implemented by a volatile memory (e.g., Synchronous Dynamic Random Access Memory (SDRAM), Dynamic Random Access Memory (DRAM), RAMBUS Dynamic Random Access Memory (RDRAM, etc.) and/or a non-volatile memory (e.g., flash memory). Additionally or alternatively, the memory 312 may include one or more double data rate (DDR) memories, such as DDR, DDR2, DDR3, mobile DDR (mDDR), etc. The memory 312 may additionally or alternatively include one or more mass storage devices such as, for example, hard drive disk(s), compact disk drive(s), digital versatile disk drive(s), etc. The example portable meter 110 of FIG. 3 may be implemented by, for example, a mobile computing device 110. Thus, the portable meter 110 may utilize memory of the mobile computing device 110 to store information such as, for example, the media identifying information, the audio data, etc.

The example media detector 302 of FIG. 3 identifies media by detecting audio codes (e.g., watermarks) embedded with or otherwise conveyed (e.g., broadcast) with media being presented by the information presentation device 102 (and/or by any other information presentation device). In the illustrated example, the media detector 302 extracts the codes from the ambient audio data. In some examples, the media detector 302 is eliminated and the meter 106, 110 does not analyze the ambient audio. Instead, the meter 106, 110 collects samples of the ambient audio data and exports the samples to a remote site for detection of the code(s). In such examples, the media detector 302 is not present in the meter, but instead is located in a data collection facility 316.

Additionally or alternatively, the media detector 302 of FIG. 3 extracts signature(s) representative of respective portion(s) of the audio data. In some examples, the media detector 302 is eliminated and the meter 106, 110 does not analyze the ambient audio data. Instead, the meter 106, 110 collects samples of the ambient audio and exports the samples to a remote site 316 for generation of the signature(s). In the example of FIG. 3, irrespective of the manner in which the media of the presentation is identified (e.g., based on codes, watermarks and/or signatures, locally or remotely, etc), the media identification information is time stamped by the time stamper 310 and stored in the memory 312.

In the illustrated example of FIG. 3, an output device 314 periodically and/or aperiodically exports data (e.g., the ambient audio data, media identification information, audience identification information, etc.) from the memory 312 to a data collection facility 316 via a network (e.g., a local-area network, a wide-area network, a metropolitan-area network, the Internet, a digital subscriber line (DSL) network, a cable network, a power line network, a wireless communication network, a wireless mobile phone network, a Wi-Fi network, etc.). In some examples, the example portable meter 110 is implemented in a consumer electronics device such as a cellular phone (e.g., a smart phone) and utilizes the communication abilities (e.g., network connections) of the hosting mobile computing device 110 to convey information to, for example, the data collection facility 316.

In the illustrated example of FIG. 3, the data collection facility 316 is managed and/or owned by an audience measurement entity (e.g., The Nielsen Company (US), LLC). The audience measurement entity associated with the example data collection facility 316 of FIG. 3 utilizes media identifying data and/or other data (e.g., people information such as demographics and/or tallies) collected by the meter 106, 110 and/or other devices (e.g., the people meter 108) to generate exposure information. Information from many panelist locations and/or meters may be compiled and analyzed to generate ratings representative of media exposure by one or more populations of interest.

Alternatively, analysis of the data (e.g., data generated by the media detector 302) may be performed locally (e.g., by the example meters 106, 108 and/or 110 of FIG. 3) and exported via a network or the like to a data collection facility (e.g., the example data collection facility 316 of FIG. 3) for further processing. In some examples, additional information (e.g., demographic data associated with one or more panelists, geographic data, etc.) is correlated with the exposure information by the audience measurement entity associated with the data collection facility 316 to expand the usefulness of the data collected by the example meters 106, 108 and/or 110 of FIGS. 1 and/or 2. The example data collection facility 316 of the illustrated example compiles data from a plurality of monitored panelists and/or exposure environments (e.g., other households, sports arenas, bars, restaurants, amusement parks, transportation environments, retail locations, etc.) and analyzes the data to generate exposure ratings for geographic areas and/or demographic sets of interest.

While an example manner of implementing the example meters 106 and/or 110 of FIG. 1 has been illustrated in FIG. 3, one or more of the elements, processes and/or devices illustrated in FIG. 3 may be combined, divided, re-arranged, omitted, eliminated and/or implemented in any other way. Further, the example audio sensor 300, the example media detector 302, the example collection state controller 304, the example time stamper 310, the example output device 314, and/or, more generally, the example meters 106 and/or 110 of FIG. 3 may be implemented by hardware, software, firmware and/or any combination of hardware, software and/or firmware. Thus, for example, any of the example audio sensor 300, the example media detector 302, the example collection state controller 304, the example time stamper 310, the example output device 314, and/or, more generally, the example meters 106 and/or 110 of FIG. 3 could be implemented by one or more circuit(s), programmable processor(s), application specific integrated circuit(s) (ASIC(s)), programmable logic device(s) (PLD(s)) and/or field programmable logic device(s) (FPLD(s)), etc. When reading any of the apparatus or system claims of this patent to cover a purely software and/or firmware implementation, at least one of the example audio sensor 300, the example media detector 302, the example collection state controller 304, the example time stamper 310, the example output device 314, and/or, more generally, the example meters 106 and/or 110 of FIG. 3 are hereby expressly defined to include a tangible computer readable storage device (e.g., memory) and/or a storage disc (e.g., a DVD, a CD, a Bluray disc) storing the software and/or firmware. Further still, the example meters 106 and/or 110 of FIG. 3 may include one or more elements, processes and/or devices in addition to, or instead of, those illustrated in FIG. 3, and/or may include more than one of any or all of the illustrated elements, processes and devices.

Figure 4:
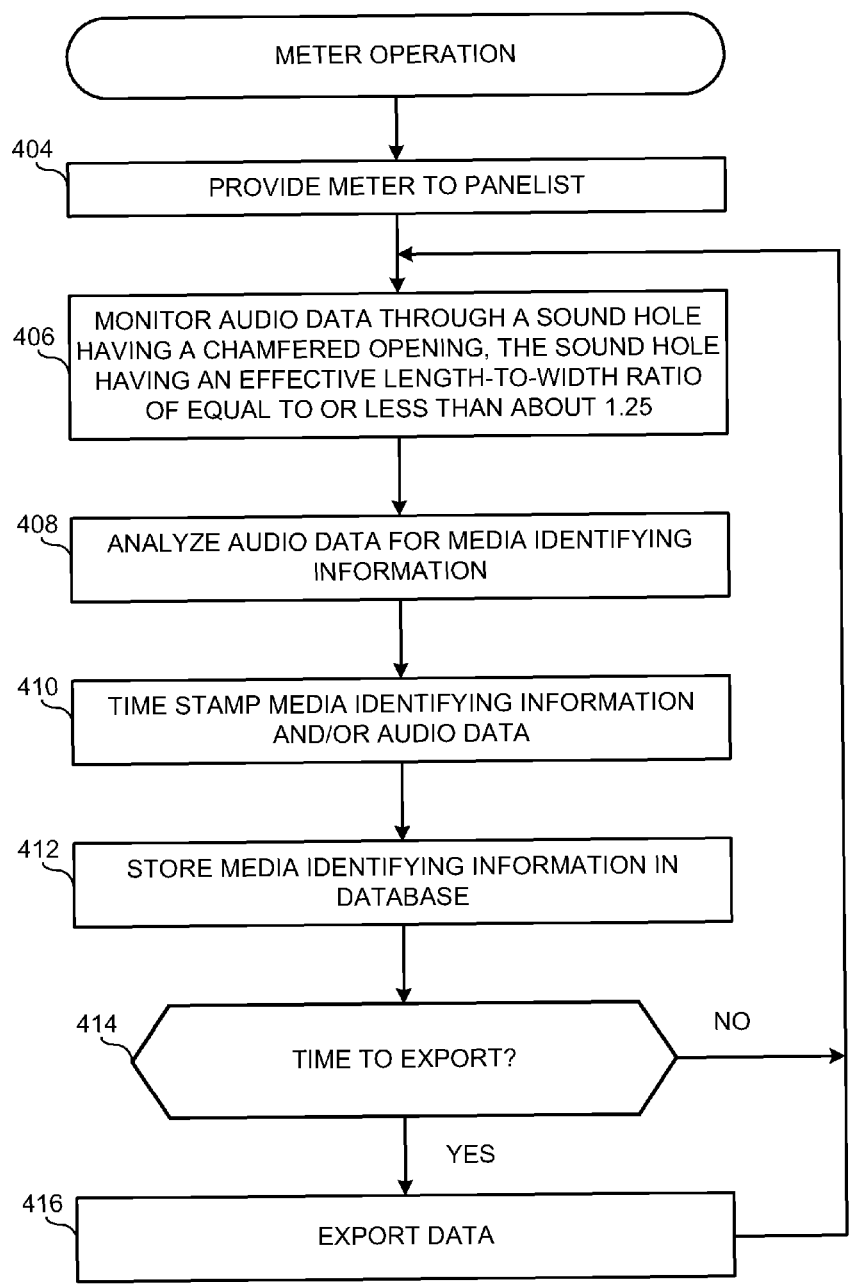
FIG. 4 is a flowchart representation of example machine readable instructions that may be executed to implement one or more of the audience measurement devices of FIGS. 1-3.

FIG. 4 is a flowchart representative of example machine readable instructions for implementing the example meters 106 and/or 110. In this example, the machine readable instructions comprise a program for execution by a processor such as the processor 612 shown in the example processing system 600 discussed below in connection with FIG. 6. The program may be embodied in software stored on a tangible computer readable storage medium such as a CD-ROM, a floppy disk, a hard drive, a digital versatile disk (DVD), a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowchart illustrated in FIG. 4, many other methods of implementing the example meters 106 and/or 110 may alternatively be used. For example, the order of execution of the blocks may be changed, and/or some of the blocks described may be changed, eliminated, or combined.

As mentioned above, the example process of FIG. 4 may be implemented using coded instructions (e.g., computer readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disc in which information is stored for any duration (e.g., for extended time periods, permanently, brief instances, for temporarily buffering, and/or for caching of the information). As used herein, the term tangible computer readable storage medium is expressly defined to include any type of computer readable storage device and/or storage disc and to exclude propagating signals. Additionally or alternatively, the example process of FIG. 4 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage medium in which information is stored for any duration (e.g., for extended time periods, permanently, brief instances, for temporarily buffering, and/or for caching of the information). As used herein, the term non-transitory computer readable medium is expressly defined to include any type of computer readable storage device or storage disc and to exclude propagating signals. As used herein, when the phrase "at least" is used as the transition term in a preamble of a claim, it is open-ended in the same manner as the term "comprising" is open ended.

The example flowchart of FIG. 4 begins when one or more of the meters 106, 108 and/or 110 are provided to a panelist (blocks 402, 404). The example meters 106 and/or 110 and the components thereof monitor, obtain and/or receive audio data from the media exposure environment 100 through a sound hole 212 having a chamfered opening 214 (block 406). The sound hole 212 has an effective length-to-width ratio of equal to or less than about 1.25. The media detector 302 analyzes the audio data to identify media identifying information such as signature(s), fingerprint(s), code(s), etc. (block 408). The media identifying information and/or audio data is time stamped and stored in the example memory 312 (blocks 410, 412). In some examples, the meter 106 and/or 110 determines whether or not to export the media identifying information, audio data and/or any associated data (block 414). In some examples, the audio data is exported to the data collection facility 316 (block 416).

Figure 5:
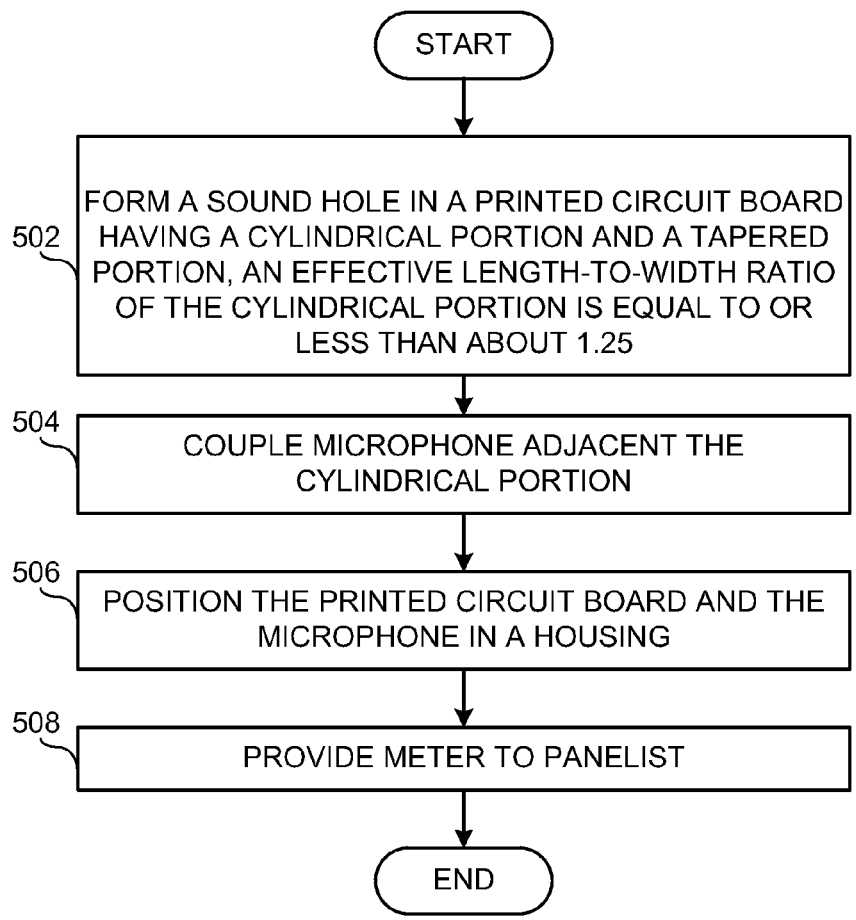
FIG. 5 is a flowchart representation of example machine readable instructions that may be executed to implement one or more of the audience measurement devices of FIGS. 1-3.

FIG. 5 illustrates an example manner of manufacturing and/or distributing a meter 106, 110. The example of FIG. 5 begins by forming a sound hole (e.g., the sound hole) 212 in a printed circuit board (e.g., the PCB) 204 (block 502). In the example of FIGS. 2 and/or 3, the sound hole includes a tapered portion 214 and a cylindrical portion 218. The cylindrical portion 218 has a length-to-width ratio which is equal to or less than about 1.25. The microphone 202 is coupled adjacent the cylindrical portion (block 504) to enable, for example, the microphone 202 to monitor audio data through the sound hole 212. The printed circuit board 204 and the microphone 202 are positioned in a housing such as, for example, the housing of a meter 106 and/or 110 (block 506). The meter 106 and/or 110 is then provided to a panelist to collect, monitor, obtain and/or receive audio data and/or media identifying information from the media exposure environment 100 (block 508).

Figure 6:
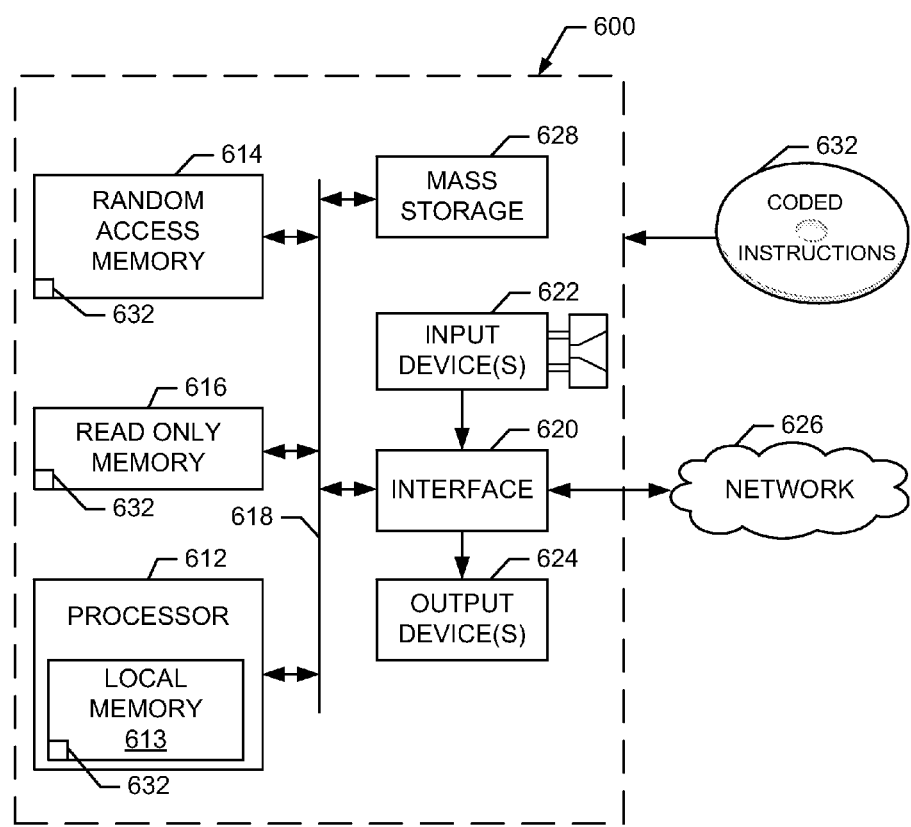
FIG. 6 is a block diagram of an example processing platform capable of executing the example machine readable instructions of FIGS. 4 and/or 5 to implement the example audience measurement device of FIGS. 1-3.

FIG. 6 is a block diagram of an example processor platform 600 capable of implementing the meter 106 and/or 110 of FIG. 3. The processor platform 600 can be, for example, a server, a personal computer, a mobile phone, a personal digital assistant (PDA), an Internet appliance, a gaming console, a personal video recorder, a set-top box, an audience measurement device, or any other type of computing device. In some examples, the meter 106, 110 is a device designated for audience measurement.

The processor platform 600 of the illustrated example includes a hardware processor 612. For example, the processor 612 can be implemented by one or more hardware processors, logic circuitry, cores, microprocessors or controllers from any desired family or manufacturer.

The processor 612 includes a local memory 613 (e.g., a cache) and is in communication with a main memory (including a volatile memory 614 and a non-volatile memory 616 via a bus 618). The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), and/or a PCI express interface.

One or more input devices 622 are connected to the interface circuit 620. The input device(s) 622 permit a user to enter data and commands into the processor 612. The input device(s) can be implemented by, for example, a microphone, a keyboard, a mouse, a touchscreen, a track-pad, a trackball, isopoint and/or a voice recognition system.

One or more output devices 624 are also connected to the interface circuit 620. The output devices 624 can be implemented, for example, by display devices (e.g., a liquid crystal display, a cathode ray tube display (CRT), a printer and/or speakers). The interface circuit 620, thus, typically includes a graphics driver card.

The interface circuit 620 of the illustrated example also includes a communication device such as a transmitter, a modem and/or network interface card to facilitate exchange of data with external computers via a network 626 (e.g., an Ethernet connection, a digital subscriber line (DSL), a telephone line, coaxial cable, a cellular telephone system, etc.).

The processor platform 600 of the illustrated example also includes one or more mass storage devices 628 for storing software and/or data. Examples of such mass storage devices 628 include floppy disk drives, hard drive disks, compact disk drives and digital versatile disk (DVD) drives.

Coded instructions 632 (e.g., the machine readable instructions of FIG. 4) may be stored in the mass storage device 628, in the volatile memory 614, in the non-volatile memory 616, and/or on a removable tangible computer readable storage medium such as a CD or DVD.

As set forth herein, an example method includes collecting audio data through a sound hole. The sound hole includes a chamfered opening. The sound hole has an effective length-to-width ratio which is equal to or less than about 1.25. The method includes analyzing the audio data to obtain media identifying data. In some examples, analyzing the audio data includes obtaining at least one of codes or signatures from the audio data. In some examples, the method includes time stamping at least one of the audio data or the media identifying data. In some examples, the chamfered opening is a conical opening defined by an angle of between about 30-degrees and about 60-degrees relative to a centerline of the sound hole.

In some examples, the chamfered opening is defined in a printed circuit board or a wall of a meter. In some examples, collecting the audio data through the sound hole includes obtaining the audio data with a bottom-ported microphone. In some examples, the microphone includes a MicroElectro-Mechanical System microphone. In some examples, the method includes providing a meter to a panelist, the meter includes the sound hole and the chamfered opening. In some examples, analyzing the audio data is performed in the meter. In some examples, the method includes exporting the audio data to a remote facility. In some examples, analyzing the audio data is performed at the remote facility.

An example apparatus includes a printed circuit board defining a sound hole. The sound hole has a cylindrical portion and a conical portion. A length-to-width ratio of the cylindrical portion is equal to or less than about 1.25. The apparatus includes an audio sensor coupled to the printed circuit board, the audio sensor is to obtain audio data through the sound hole. In some examples, the audio sensor includes a bottom-ported microphone. In some examples, the audio sensor includes a MicroElectro-Mechanical System microphone. In some examples, the apparatus includes a housing in which the printed circuit board and the microphone are positioned.

In some examples, the apparatus includes an analyzer to analyze the audio data to obtain at least one of codes or signatures from the audio data. In some examples, the apparatus includes a time stamper to time stamp at least one of the audio data or media identifying data associated with the audio data. In some examples, the conical portion is a conical opening defined by an angle of between about 30-degrees and about 60-degrees relative to a centerline of the sound hole. In some examples, the apparatus includes a meter to be provided to a panelist. The meter includes the sound hole and the conical portion. In some examples, the meter is to analyze the audio data. In some examples, the apparatus includes an exporter to export the audio data to a remote facility. In some examples, the apparatus includes an analyzer to analyze the audio data, the analyzer is located at the remote facility.

An example method includes forming a sound hole in a printed circuit board. The sound hole has a cylindrical portion and a conical portion. A length-to-width ratio of the cylindrical portion is equal to or less than about 1.25. The method includes coupling an audio sensor adjacent the cylindrical portion, the audio sensor is to obtain audio data through the sound hole. In some examples, the method includes positioning the printed circuit board and the audio sensor in a housing. In some examples, the method includes providing the meter to a panelist.

Although certain example apparatus, methods, and articles of manufacture have been disclosed herein, the scope of coverage of this patent is not limited thereto. On the contrary, this patent covers all apparatus, methods, and articles of manufacture fairly falling within the scope of the claims of this patent.

What is claimed is:

1. A method, comprising:
    collecting, with an audio sensor, audio data through a sound hole defined by a printed circuit board, the sound hole including a cylindrical portion and a chamfered opening, the sound hole having an effective length-to-width ratio which is equal to or less than about 1.25, wherein a circumference of the chamfered opening at an interface with the cylindrical portion substantially matches a circumference of the cylindrical portion at the interface; and
    analyzing, with a processor, the audio data to obtain media identifying data.

2. The method of claim 1, wherein the analyzing of the audio data includes obtaining at least one of codes or signatures from the audio data.

3. The method of claim 1, further including time stamping at least one of the audio data or the media identifying data.

4. The method of claim 1, wherein the chamfered opening is a conical opening defined by an angle of between about 30-degrees and about 60-degrees relative to a centerline of the sound hole.

5. The method of claim 1, wherein the audio sensor is implemented by a bottom-ported microphone, and the collecting of the audio data through the sound hole includes collecting the audio data with the bottom-ported microphone.

6. The method of claim 5, wherein the microphone includes a MicroElectro-Mechanical System microphone.

7. The method of claim 1, further including providing a meter to a panelist, the meter including the sound hole and the chamfered opening.

8. The method of claim 7, wherein the analyzing of the audio data is performed in the meter.

9. The method of claim 7, further including exporting the audio data to a remote facility.

10. The method of claim 9, wherein the analyzing of the audio data is performed at the remote facility.

11. The method of claim 1, wherein the chamfered opening includes a conical opening.

12. An apparatus, comprising:
    a printed circuit board defining a sound hole, the sound hole having a cylindrical portion and a conical portion, an effective length-to-width ratio of the sound hole being equal to or less than about 1.25, wherein a circumference of the conical portion at an interface with the cylindrical portion substantially matches a circumference of the cylindrical portion at the interface; and an audio sensor coupled to the printed circuit board, the audio sensor to obtain audio data through the sound hole.

13. The apparatus of claim 12, wherein the audio sensor includes a bottom-ported microphone.

14. The apparatus of claim 12, wherein the audio sensor includes a MicroElectro-Mechanical System microphone.

15. The apparatus of claim 12, further including a housing in which the printed circuit board and the audio sensor are positioned.

16. The apparatus of claim 12, further including an analyzer to analyze the audio data to obtain at least one of codes or signatures from the audio data.

17. The apparatus of claim 12, further including a time stamper to time stamp at least one of the audio data or media identifying data associated with the audio data.

18. The apparatus of claim 12, wherein the conical portion is a conical opening defined by an angle of between about 30-degrees and about 60-degrees relative to a centerline of the sound hole.

19. The apparatus of claim 12, further including a meter to be provided to a panelist, the meter including the sound hole and the conical portion.

20. The apparatus of claim 19, wherein the meter is to analyze the audio data.

21. The apparatus of claim 19, further including an exporter to export the audio data to a remote facility.

22. The apparatus of claim 21, further including an analyzer to analyze the audio data, the analyzer being located at the remote facility.

23. A method, comprising:
forming a sound hole in a printed circuit board, the sound hole having a cylindrical portion and a conical portion, an effective length-to-width ratio of the sound hole being equal to or less than about 1.25, wherein a circumference of the conical portion at an interface with the cylindrical portion substantially matches a circumference of the cylindrical portion at the interface; and
coupling an audio sensor adjacent the cylindrical portion, the audio sensor to obtain audio data through the sound hole.

24. The method of claim 23, further including positioning the printed circuit board and the audio sensor in a housing.

25. The method of claim 24, further including providing a meter to a panelist, the meter including the housing.

* * * * *